(12) United States Patent
Garg et al.

(10) Patent No.: US 12,126,464 B2
(45) Date of Patent: *Oct. 22, 2024

(54) CONTEXTUAL APPLICATION INTERACTIONS WITH CONNECTED DEVICES

(71) Applicant: Transform SR Brands LLC, Hoffman Estates, IL (US)

(72) Inventors: Parag Kumar Garg, Woodinville, WA (US); Nicholas Frank LaVassar, Issaquah (IL); Joseph Reid Baird, Sammamish, WA (US); Donald Smyth, Seattle, WA (US); Jonathan Kevin Gagliardoni, Seattle, WA (US); Darrin Michael Johnson, Bonny Lake, WA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,536

(22) Filed: Jan. 9, 2023

(65) Prior Publication Data

US 2023/0163992 A1    May 25, 2023

Related U.S. Application Data

(63) Continuation of application No. 16/534,990, filed on Aug. 7, 2019, now Pat. No. 11,575,535, which is a
(Continued)

(51) Int. Cl.
*G06F 9/451* (2018.01)
*G01C 21/20* (2006.01)
(Continued)

(52) U.S. Cl.
CPC .......... *H04L 12/282* (2013.01); *G01C 21/206* (2013.01); *G06F 9/451* (2018.02);
(Continued)

(58) Field of Classification Search
CPC ......... H04M 1/72519; H04M 1/72533; H04W 4/80; H04L 12/282; H04L 12/2838
See application file for complete search history.

(56) References Cited

U.S. PATENT DOCUMENTS 7,752,511 B2   7/2010   Fulton
7,953,513 B2   5/2011   Bhat
(Continued)

OTHER PUBLICATIONS

Int'l Search Report and Written Opinion ApplIn No. PCT/US2018/015332 mailed Apr. 13, 2018.
(Continued)

*Primary Examiner* — Phenuel S Salomon
(74) *Attorney, Agent, or Firm* — McAndrews, Held & Malloy, Ltd.

(57) ABSTRACT

Systems and methods for providing contextual interaction with connected devices are described. A mobile device having a display that presents a user interface enabling access to functionalities provided by connected devices. The user interface may be updated as various contextually-related data is received. For example, data representing a current position of the mobile device, such as Bluetooth low energy beacon signals, WiFi signals, and the like, may be monitored. In response to determining that the current position is within a threshold proximity of a first location, the user interface may be updated to emphasize a first location interface corresponding to the first location over interfaces corresponding to other locations.

18 Claims, 8 Drawing Sheets

Related U.S. Application Data continuation of application No. 15/615,667, filed on Jun. 6, 2017, now abandoned.

(60) Provisional application No. 62/450,460, filed on Jan. 25, 2017.

(51) Int. Cl.
    *H04L 12/28* (2006.01)
    *H04L 12/46* (2006.01)
    *H04M 1/72415* (2021.01)
    *H04W 4/80* (2018.01)
    *H04W 4/70* (2018.01)

(52) U.S. Cl.
    CPC .... *H04L 12/4625* (2013.01); *H04M 1/72415* (2021.01); *H04W 4/80* (2018.02); *H04W 4/70* (2018.02)

(56) References Cited

U.S. PATENT DOCUMENTS

| | | |
|---|---|---|
| 8,195,844 B2 | 6/2012 | Fulton |
| 9,253,631 B1 | 2/2016 | White |
| 2011/0313657 A1 | 12/2011 | Myllymaki |
| 2012/0296909 A1* | 11/2012 | Cao ........................ G06F 16/337 707/E17.032 |
| 2012/0309376 A1 | 12/2012 | Huang |
| 2012/0316984 A1 | 12/2012 | Glassman |
| 2012/0324434 A1 | 12/2012 | Tewari et al. |
| 2014/0235168 A1 | 8/2014 | Molettere et al. |
| 2014/0245461 A1* | 8/2014 | O'Neill ................ G06F 21/6245 726/28 |
| 2015/0019553 A1* | 1/2015 | Shaashua ................. G06N 5/04 707/737 |
| 2015/0019704 A1* | 1/2015 | Suryanarayanan ..... H04L 43/08 709/224 |
| 2016/0041534 A1 | 2/2016 | Gupta |
| 2016/0225372 A1 | 8/2016 | Cheung et al. |
| 2016/0350659 A1 | 12/2016 | Tsao |
| 2017/0019264 A1* | 1/2017 | Nugent .................... H04L 67/52 |
| 2017/0064073 A1* | 3/2017 | Spencer .......... H04M 1/724631 |
| 2017/0180149 A1* | 6/2017 | McConnell ............ H05B 47/19 |

OTHER PUBLICATIONS

Int'l Preliminary Report on Patentability Appln No. PCT/US2018/015332 mailed Aug. 8, 2019.

* cited by examiner

CONTEXTUAL APPLICATION INTERACTIONS WITH CONNECTED DEVICES

CLAIM OF PRIORITY

This patent application is a continuation of U.S. patent application Ser. No. 16/534,990, filed on Aug. 7, 2019, which is a continuation of U.S. patent application Ser. No. 15/615,667, filed on Jun. 6, 2017, now abandoned, which claims priority to U.S. Provisional Patent Application No. 62/450,460, filed Jan. 25, 2017. The above referenced documents are hereby incorporated herein by reference in their entirety.

BACKGROUND

This disclosure relates generally to providing contextual interactions with connected devices via a network. Examples of such connected devices include conventional appliances, entertainment electronics, hazard detectors, lighting devices, components of climate control systems, and other known Internet of Things ("IOT") devices. Users of conventional solutions may interact with such connected devices using pre-defined, static user interfaces presented by client applications running on computing devices. These static user interfaces may not account for external information that impacts a context of the user's interaction with the connected devices. For example, static user interfaces may not account for a user's current location when interacting with the connected devices.

DETAILED DESCRIPTION OF EMBODIMENTS

Figure 1:
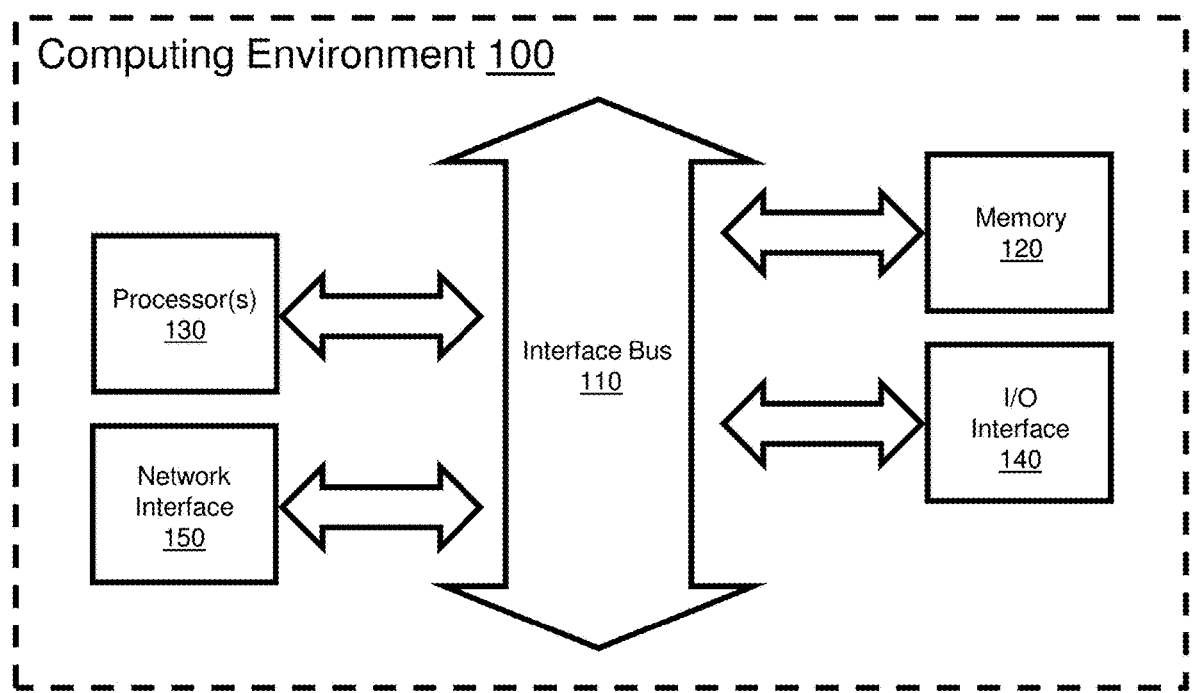
FIG. 1 depicts an example general purpose computing environment in which embodiments of the invention may be implemented.

Various aspects of the present disclosure described herein are generally directed to systems, methods, and computer-readable storage media for, among other things, providing contextual interactions with connected devices and associated functionality. As used herein, "connected device" refers to an addressable device having network connectivity that is configured to communicate with other computing devices via one or more networks (e.g., network 250 of FIG. 2). That is, a connected device is capable of serving as an endpoint, connection point, and/or a redistribution point of a communication session communicatively coupling the connected device with another network-connected computing node. In an embodiment, a connected device is an IOT device. In contrast, "non-connected device" refers to a non-addressable device lacking network connectivity that is not configured to communicate with other computing devices via one or more networks.

According to an aspect of the subject matter, a system is provided for contextual interaction with connected devices. The system includes a mobile device having a display on which a user interface is presented. The user interface enables access to functionalities provided by the connected devices. The system monitors, at the mobile device, data representing a current position of the mobile device within a structure. The system also determines, at a first time, that the current position is within a threshold proximity of a first location of the structure. In response to determining that the current position is within the threshold proximity, the system updates the user interface to emphasize a first location interface corresponding to the first location over interfaces corresponding to other locations of the structure.

In another embodiment, a method provides for contextual interaction with connected devices. The method includes monitoring, at a mobile device, data representing a current position of the mobile device. The method also includes determining, at a first time, that the current position is within a threshold proximity of a first structure. In response to determining that the current position is within the threshold proximity, a user interface of the mobile device is updated to present a first structure interface enabling access to functionalities provided by connected devices at the first structure.

In another embodiment, a system provides for contextual interaction with connected devices. The system includes a mobile device having a display on which a user interface is presented. The user interface enables access to functionalities provided by the connected devices. The system detects, at the mobile device, data indicative of a first connected device proximate to the mobile device. In response to detecting the data indicative of the first connected device, the system updates the user interface to present a request interface associated with the first connected device. The system forwards, to a remote server, an access request that is received via the request interface. A permission setting granting access to the first connected device is received from the remote server in response to the access request. The user interface is updated to present an access interface enabling access to functionalities of the first connected device that are designated in the permission setting.

Having briefly described an overview of embodiments of the invention, an example of a computing environment suitable for implementing the embodiments is described below. Referring to the figures generally and initially to FIG. 1 in particular, an exemplary computing environment in which embodiments of the present invention is depicted and generally referenced as computing environment 100. As utilized herein, the phrase "computing system" generally refers to a dedicated computing device with processing power and storage memory, which supports operating software that underlies the execution of software, applications, and computer programs thereon. As used herein, an application is a small in storage size, specialized program that is downloaded to the computing system or device. In some cases, the application is downloaded from an "App Store" such as APPLE's APP STORE or GOOGLE's ANDROID MARKET. After download, the application is generally installed on the computer system or computing device. As shown by FIG. 1, computing environment 100 includes bus 110 that directly or indirectly couples the following components: memory 120, one or more processors 130, I/O interface 140, and network interface 150. Bus 110 is configured to communicate, transmit, and transfer data, controls, and commands between the various components of computing environment 100.

Computing environment 100 typically includes a variety of computer-readable media. Computer-readable media can be any available media that is accessible by computing environment 100 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 120 includes computer-storage media in the form of volatile and/or nonvolatile memory. The memory may be removable, non-removable, or a combination thereof. Memory 120 may be implemented using hardware devices such as solid-state memory, hard drives, optical-disc drives, and the like. Computing environment 100 also includes one or more processors 130 that read data from various entities such as memory 120, I/O interface 140, and network interface 150.

I/O interface 140 enables computing environment 100 to communicate with different input devices and output devices. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 110 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 140 is configured to coordinate I/O traffic between memory 120, the one or more processors 130, network interface 150, and any combination of input devices and/or output devices.

Figure 2:
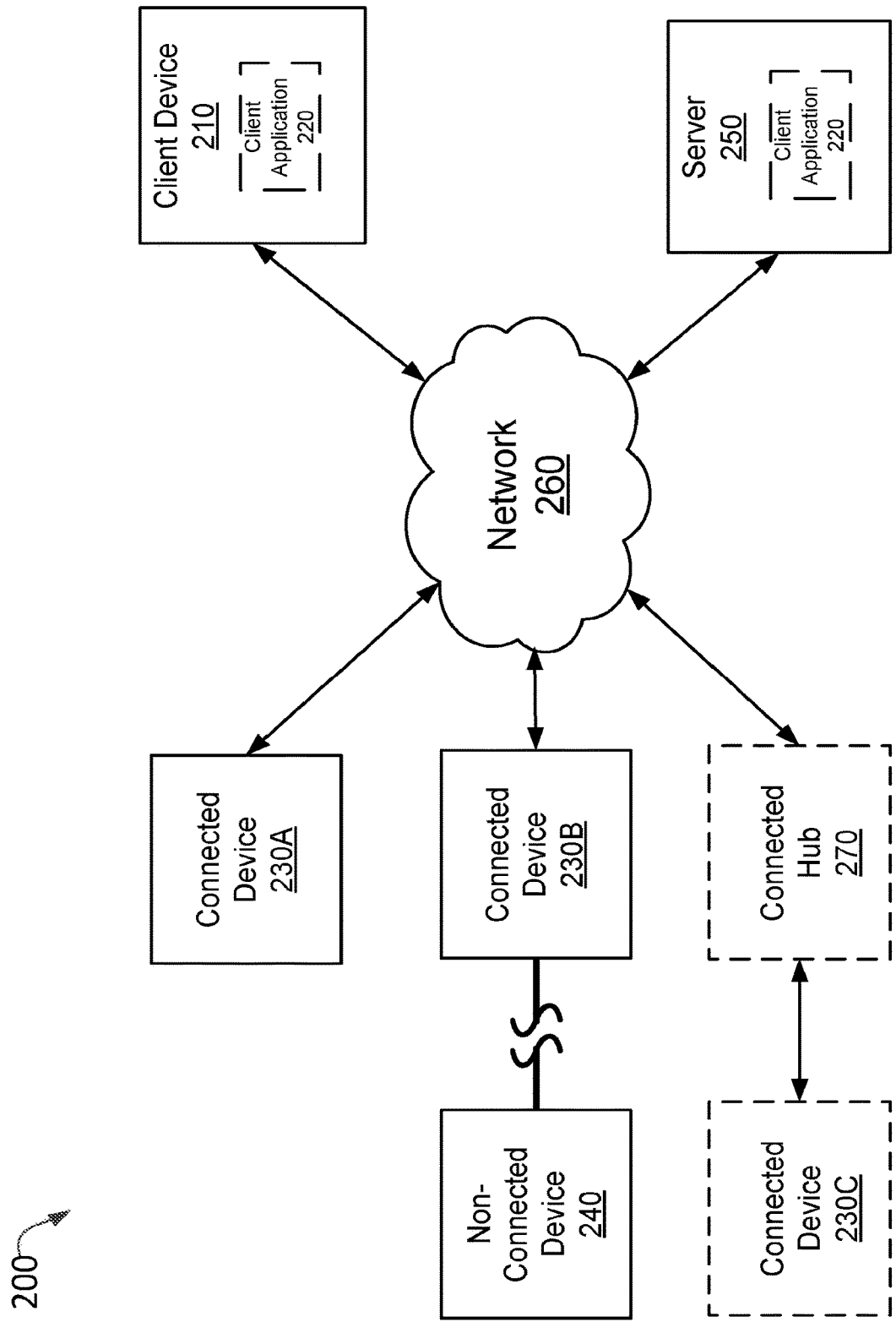
FIG. 2 depicts an example operational environment for implementing aspects of the present invention.

Network interface 150 enables computing environment 100 to exchange data with other computing devices (e.g., client device 210, connected devices 230A-C, and server 250 of FIG. 2) via any suitable network (e.g., network 250). In a networked environment, program modules depicted relative to computing environment 100, or portions thereof, may be stored in a remote memory storage device accessible via network interface 150. It will be appreciated that the network connections shown are exemplary and other means of establishing a communications link between the computers may be used.

Turning to FIG. 2, an example operational environment for implementing aspects of the subject matter is depicted and referenced generally by designator 200. FIG. 2 and the other figures use like reference numerals to identify like elements. A letter after a reference numeral, such as "230A", indicates that the text refers specifically to the element having that particular reference numeral. A reference numeral in the text without a following letter, such as "230", refers to any or all of the elements in the figures bearing that reference numeral. The components shown in FIG. 2 are a few of the components that embodiments of the present invention may interact with during operation. Accordingly the components therein are described with an emphasis on function and in brief for the sake of simplicity. One skilled in the art will recognize that operational environment 200 is but one example of a suitable operational environment for implementing aspects of the invention. As such, operational environment 200 is not intended to suggest any limitation as to the scope of use or functionality of the invention. Thus, the example operational framework is to be treated as illustrative only and in no way limit the scope of the claims.

As discussed above, users of conventional solutions may interact with connected devices using pre-defined, static user interfaces presented by client applications running on computing devices. Such static user interfaces may not account for external information that impacts a context of a user's interaction with a particular connected device. By not accounting for that external information, conventional solutions require the user to navigate through various levels of interfaces and/or menus to identify an interface corresponding to the particular connected device. This approach decreases user efficiency thereby negatively impacting the user's experience. Furthermore, the user's computing device must process multiple user inputs as the user navigates through the various levels of interfaces and/or menus thereby negatively impacting an efficiency of the computing device.

Operational environment 200 is configured to leverage various sources external information that impacts a context of a user's interaction with connected devices. Providing contextual interaction with the connected devices enables operational environment 200 to improve user experience and computing device efficiency by allowing users to interaction with connected devices in a seamless manner. Operational environment 200 includes client device 210 that is comprised of circuitry configured to effectuate client application 220 for providing contextual interaction with one or more connected devices (e.g., connected devices 230A-C) and their associated functionalities. As used herein, the term "client device" can be used interchangeably with the terms "mobile device," "portable device," and "computing device." Operational environment 200 may include any number of client devices. A single client device is shown for the sake of simplicity. In an embodiment, client device 210 is implemented in a computing environment similar to computing environment 100 of FIG. 1.

Client device 210 can be implemented as any device capable of processing machine-readable instructions. Examples of suitable devices for implementing client device 210 include a desktop computer, a laptop computer, a smartphone, a notepad computer, a game console, an entertainment appliance, and the like. Client device 210 may be associated with a user. The user is the person submitting instructions and interacting with client device 210.

Client application 220 is configured to present a user interface on a display of client device 210 through which the user associated with client device 210 may interact with connected devices. In an embodiment, client application 220 is a native application executing within a local computing environment instantiated using computing resources provided by client device 210. In an embodiment, client application 220 is a web application executing within a runtime environment of a web browser or other web based interface. In an embodiment, client application 220 is a virtualized application executing in a virtualized environment communicatively coupled to client device 210 via network 260. For example, client application 220 may be a virtualized application deployed within a session-based desktop environment or a virtual machine-based desktop environment. In an embodiment, client application 220 is a hybrid application comprising a local process executing on computing resources provided by client device 210 and a remote process executing on computing resources provided by a remote computing device (e.g., server 250).

Some embodiments of the invention described herein discuss client device displays in terms of touchscreens (or touch-sensitive displays) for the sake of enablement. However, embodiments are not limited to a touchscreens, but rather may include other known displays capable of displaying graphics and text associated with an application. As known by those skilled in the art, a touchscreen is concurrently an input device and an output device as it provides both input and output interfaces for through which a client device and an associated user interact.

A user interface presented by client application 220 includes one or more interface elements associated with functionalities provided by connected devices. The one or more interface elements may include information elements enabling data access to the connected devices. Information elements provide users with information relating to device state (e.g., on/off, open/closed, active/inactive, error codes, and the like), environmental conditions (e.g., ambient temperature, ambient humidity, illuminance, and the like), and device attributes (e.g., device make, device model, device identifier, and the like). In an embodiment, information elements may also provide users with data generated by the connected devices, such as sensor data and image data.

As another example, the one or more interface elements may include control elements enabling control access to the connected devices. Control elements are selectable to generate control commands that are communicated to a corresponding connected device. In response to receiving a control command, the corresponding connected device modifies one or more of its controllable parameters. Stated differently, control elements are selectable to modify, control, adjust, and/or otherwise influence a current device state of a corresponding connected device. For example, client application 220 my present a user interface having a control element that is selectable to transition a lighting device from an "OFF" state to an "ON" state. As another example, client application 220 may present a user interface having a control element that is selectable to adjust a temperature set point of a thermostat.

Operational environment 200 may include any variety of connected devices 230. For example, operational environment 200 may include connected devices (e.g., connected device 230A) that provide remote clients (e.g., client device 210 or server 250) with direct access to its functionalities. For example, connected device 230A may be implemented as an appliance (e.g., a refrigerator, a coffee maker, an alarm clock, and the like), entertainment electronics (e.g., a television, an audio device, a gaming system, and the like), hazard detectors (e.g., a smoke detector, a carbon monoxide detector, and the like), lighting devices (e.g., a light bulb, architectural lighting, and the like), components of climate control systems (e.g., a heater, an air conditioner, a thermostat, and the like), and any other known Internet of Things ("TOT") device.

Operational environment 200 may also include connected devices (e.g., connected device 230B) that interface with non-connected devices (e.g., non-connected device 240) to provide remote clients (e.g., client device 210 or server 250) with indirect access to functionalities provided by the non-connected devices. For example, connected device 230B may be implemented using a "smart plug" that is configured to enable remote clients to connect and disconnect non-connected devices from an electrical power source, schedule electrical power to non-connected devices, and monitor non-connected devices energy usage.

Server 250 provides computing resources to remote clients (e.g., client device 210 and/or connected devices 230A-C) via network 260. Server 250 may be implemented using one or more computing devices each composed of well-known hardware components such as one or more processors coupled to network interfaces and storage devices. In an embodiment, a computing device further includes a virtualization component (e.g., hypervisor or virtual machine monitor) permitting a plurality of computing devices to share underlying physical hardware of the computing device. The one or more processors of server 250 execute various software components (e.g., computer executable instructions) loaded from non-transitory storage devices. By executing the software components, the one or more processors are configured to perform various functionalities on behalf of the remote clients.

In an embodiment, server 250 is a cloud-based server providing a shared pool of configurable computing resources to remote clients as a service. That is, server 250 may be implemented with a service-oriented architecture in which software components executing on hardware resources associate with server 250 provide services to other software components executing on remote devices (e.g., client device 210 and/or connected devices 230A and 230B). Examples of such services provided by server 250 include infrastructure services, platform services, software application services, and combinations thereof.

Network 260 represents any communication network that enables computing devices to exchange data. Network 260 may include a combination of discrete networks that may use different communication protocols, but is depicted in simple form to not obscure other aspects of the present invention. For example, network 260 may be implemented using a cellular network, a WiFi/broadband network, a local area network (LAN), a wide area network (WAN), a telephony network, a fiber-optic network, an infrared network, the Internet, or a combination thereof. Communication over the network 260 may be enabled by any combination of wired communication links or wireless communication links.

Operational environment 200 may optionally include connected hub 270 as indicated by the dashed lines. Connected hub 270, in general, serves as an end access point for remote clients (e.g., client device 210 or server 250) to interact with one or more connected devices (e.g., connected device 230C) via network 260. In operational environment 200, a remote client establishes a communication session with a network interface of connected hub 270. Connected hub 270 and the remote client exchange communications regarding connected devices within the communication session. For example, connected hub 270 may receive a command instruction from a remote client within a communication session via the network interface. As another example, connected hub 270 may communicate information associated with one or more connected devices to the remote client within the communication session via the network interface.

Figure 3:
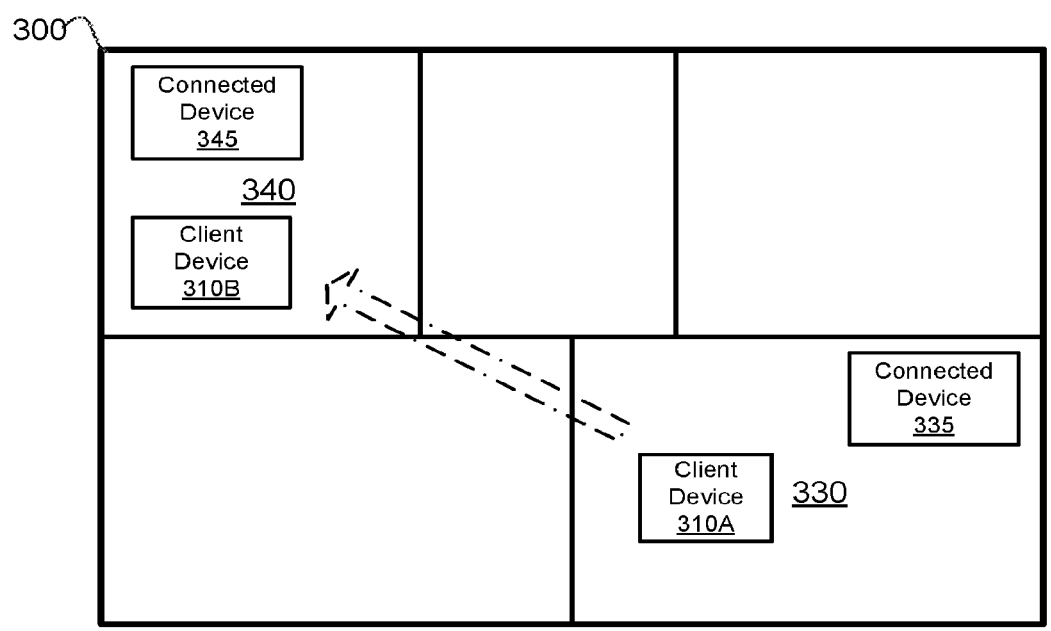
FIG. 3 illustrates an example of providing location-based contextual interactions with connected devices.

FIG. 3 illustrates an example of providing location-based contextual interactions with connected devices. In the example of FIG. 3, a client device traversing within a structure 300 associated with connected devices in accordance with one embodiment of the invention. The client device may have a display for presenting a user interface that enables access to functionalities provided by the connected devices. A client application (e.g., client application 220 of FIG. 2) may monitor data representing a current position of the client device within structure 300. Examples of such data representing the current position may include: a Bluetooth Low Energy ("BLE") beacon, a WiFi signal, a cellular network signal, and the like.

Figure 4A:
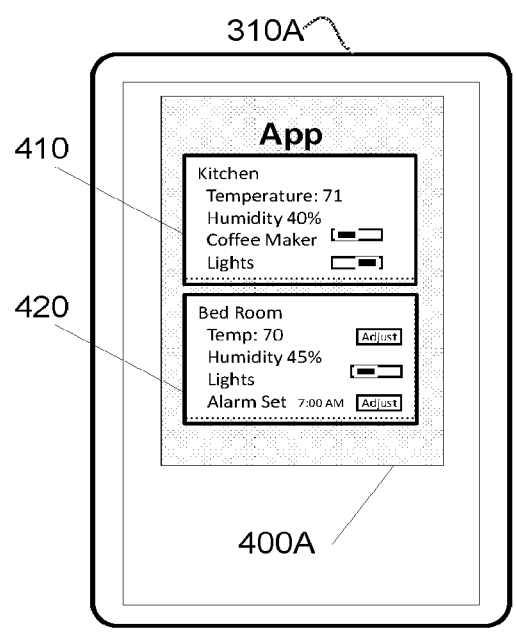
FIGS. 4A-4B depict examples of user interfaces providing location-based contextual interactions in the embodiment of FIG. 3.

At a first time, the client application may determine that a current position of the client device (represented by client device 310A) is within a threshold proximity of a first location 330 of structure 300. For example, the client application may receive a wireless signal from a first connected device 335 at the first time. Using that wireless signal, the client application of this example may determine that the current position is within the threshold proximity of the first location 330. Responsive to that determination at the first time, the client application may update the user interface to emphasize a first location interface corresponding to the first location 330 over interfaces corresponding to other locations of structure 300. For example, if the first location 330 is a kitchen, the user interface may be updated as shown in the embodiment depicted in FIG. 4A. As best seen in FIG. 4A, the client application may bring a first location interface 410 corresponding to the kitchen to an upper portion (or easier to access locations) of a user interface 400A.

Figure 4B:
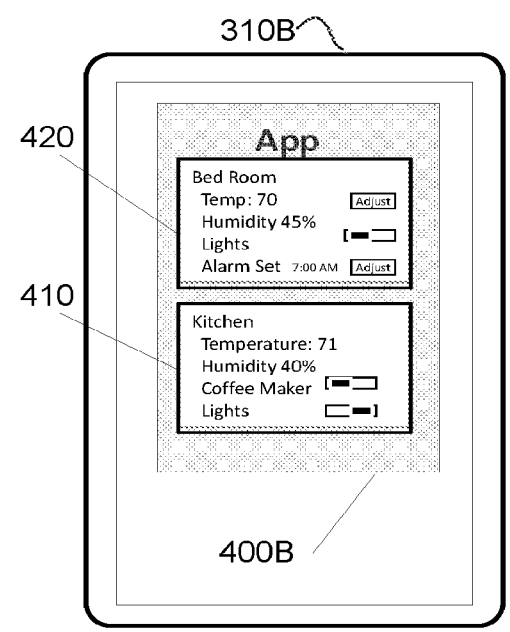

Returning to FIG. 3, at a second time subsequent to the first time, the client application may determine that the current position of the client device (represented by client device 310B) is in closer proximity to a second location 340 of structure 300. For example, the client application may receive a wireless signal from a second connected device 345 at the second time. Using that wireless signal, the client application of this example may determine that the current position is in closer proximity to the second location 340. Responsive to that determination at the second time, the client application may update the user interface to emphasize a second location interface corresponding to the second location 340 over the first location interface. For example, if the first location 330 is a kitchen and the second location 340 is a bedroom, the user interface may be updated as shown in the embodiment depicted in FIG. 4B. As best seen in FIG.

4B, the client application may bring a second location interface 420 corresponding to the bedroom to the upper portion of a user interface 400B. In doing so, the client application may move interfaces corresponding to other locations of structure 300 (e.g., first location interface 410) to lower portions (or less accessible locations) of the user interface 400B.

Figure 5:
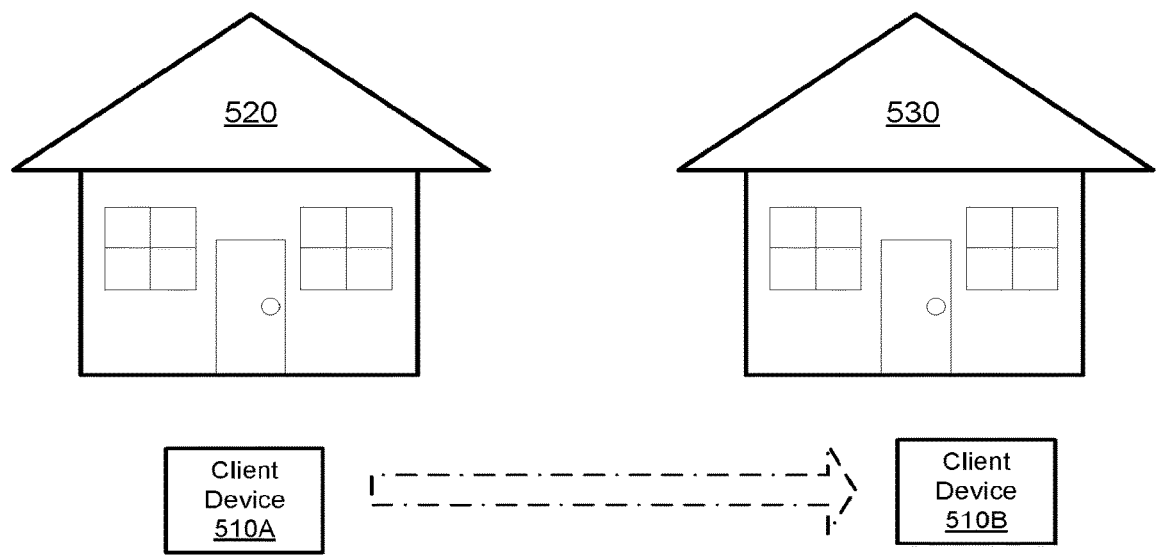
FIG. 5 illustrates another example of providing location-based contextual interactions with connected devices.

FIG. 5 illustrates another example of providing location-based contextual interactions with connected devices. In the example of FIG. 5, a client device traversing between structures associated with connected devices in accordance with one embodiment of the invention. The client device may also have a display for presenting a user interface that enables access to functionalities provided by the connected devices. A client application (e.g., client application 220 of FIG. 2) may monitor data representing a current position of the client device. Examples of such data representing the current position may include: a BLE beacon, a WiFi signal, a GPS signal, a cellular network signal, and the like.

Figures 6A, 6B:
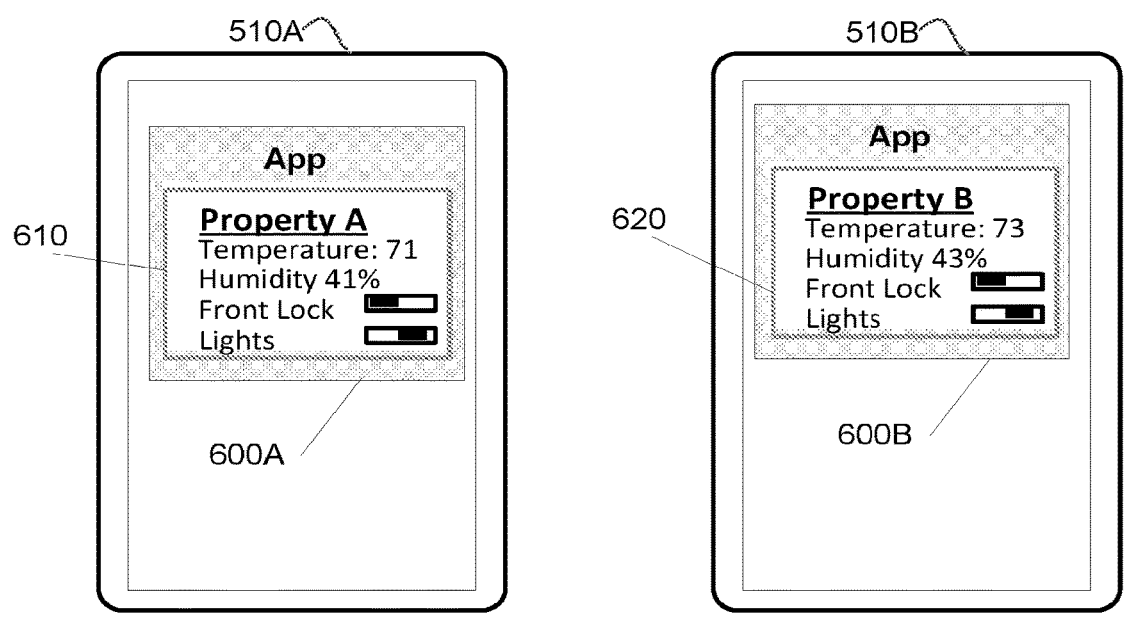
FIGS. 6A-6B depict examples of user interfaces providing location-based contextual interactions in the embodiment of FIG. 5.

At a first time, the client application may determine that a current position of the client device (represented by client device 510A) is within a threshold proximity of a first structure 520. For example, a client application in a GPS-denied environment (e.g., inside an apartment building or a shopping mall) may receive a wireless signal from a WiFi access point associated with the first structure 520 at the first time. Using that wireless signal, the client application of this example may determine that the current position is within the threshold proximity of the first structure 520. Responsive to that determination at the first time, the client application may update the user interface to present a first structure interface enabling access to functionalities provided by connected devices at the first structure 520. As best seen in the embodiment of FIG. 6A, the client application may present a first structure interface 610 corresponding to the first structure 520 on a user interface 600A.

There are a variety of techniques contemplated to determine the location of the application. The techniques contemplate that the application calls a service to determine location or that the application itself contains the logic to determine location. In either case, the logic to determine location could be based on at least on or more of the following inputs: GPS and WiFi location provided by the OS; BLE beacon detection, again provided by the host OS; causing the client device to send a BLE beacon, WiFi signal or BLE signal that is detected by an external device that is determines location, e .g., in the cloud and provides relevant location information to the application. The above list is intended to be exemplary as there may be other embodiments such as the mobile device detecting multiple beacons nearby and triangulating to determine estimated location.

In an embodiment, upon determining that the current position is within the threshold proximity of first structure 520, the client application may designate first structure 520 as a target location. In an embodiment, control commands received by the client application would be routed to connected devices associated with first structure 520 as the designated target location. For example, an "unlock door" control command received via user interface 600A would be routed to a connected device associated with a door at first structure 520.

Returning to FIG. 5, at a second time subsequent to the first time, the client application may determine that the current position of the client device (represented by client device 510B) is in closer proximity to a second structure 530 than the first structure 520. For example, the client application may receive a wireless signal from a WiFi access point associated with the second structure 530 at the second time. Using that wireless signal, the client application of this example may determine that the current position is in closer proximity to the second location 530. Responsive to that determination at the second time, the client application may update the user interface to replace the first location interface 610 with a second location interface 620. As best seen in the embodiment of FIG. 6B, the client application may only present the second location interface 620 enabling access to functionalities provided by connected devices at the second structure 530 on the user interface 600B.

In an embodiment, upon determining that the current position is in closer proximity to second location 530, the client application may update its target structure designation to identify second structure 530 as the target structure. In an embodiment, control commands received by the client application would be routed to connected devices associated with second structure 530 as the current designated target location—not first structure 520. For example, an "unlock door" control command received via user interface 600AB would be routed to a connected device associated with a door at second structure 530.

Figure 7:
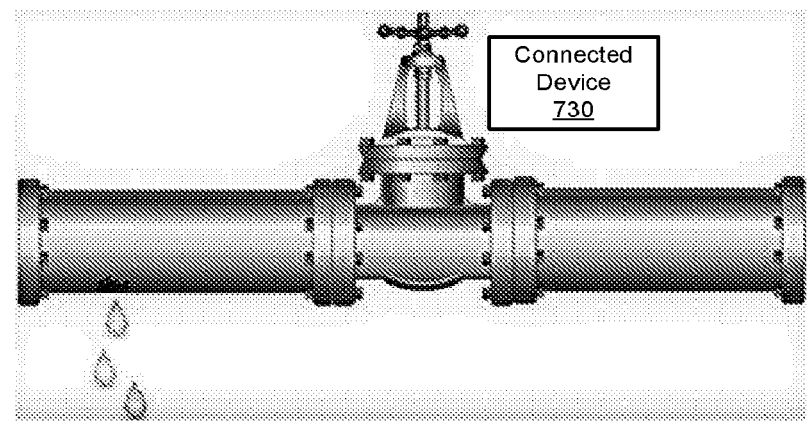
FIG. 7 illustrates an example of providing event-based contextual interactions with connected devices.
Figure 7:
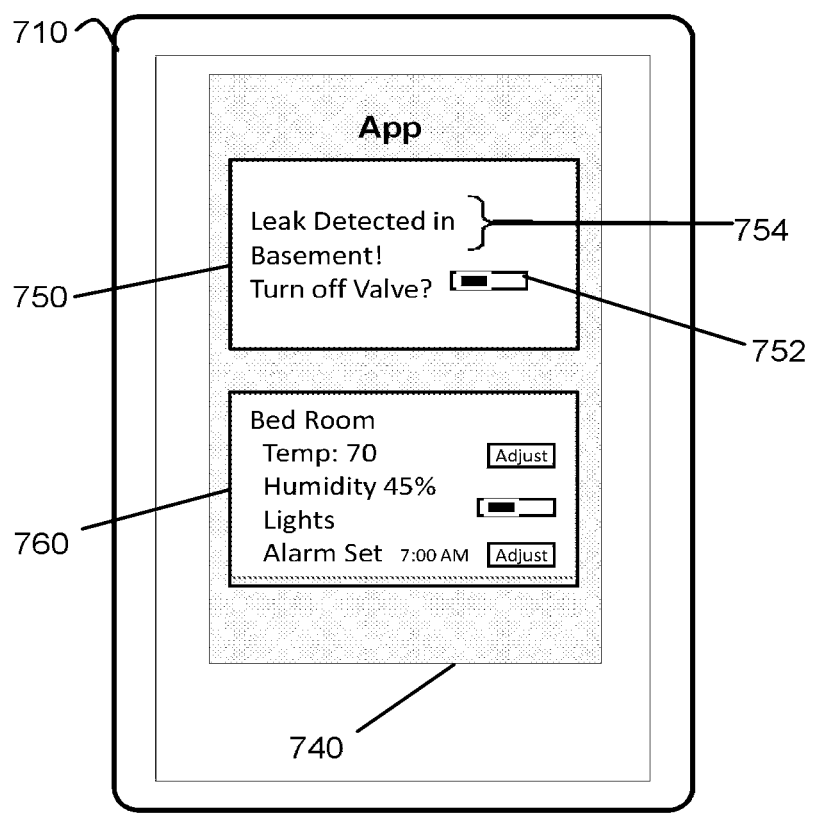

FIG. 7 illustrates an example of providing event-based contextual interactions with connected devices. In the example of FIG. 7, a client application (e.g., client application 220 of FIG. 2) running on computing device 710 may receive an event notification corresponding to an intrinsic condition. As used here, "intrinsic condition" refers to a condition that originates from within or proximate to a structure associated with connected devices. In this example, the intrinsic condition is a water leak detected by first connected device 720.

In response to receiving the event notification, the client may update a user interface to include an alert notification (e.g., user interface 740 and alert notification 750, respectively). As shown in FIG. 7, alert notification 750 includes information 752 describing an event obtained from the event notification (i.e., the water leak). In an embodiment, the client application may identify a functionality provided by a connected device that relates to the intrinsic condition. For example, the client application in the embodiment of FIG. 7 has identified an actuator function for closing a valve provided by a connected device 730 as being related to the detected water leak. In an embodiment, the client application presents an interface element (e.g., interface element 754) on an alert interface that is selectable for implementing the identified functionality.

In an embodiment, in updating a user interface to include an alert notification, the client application may move interfaces corresponding to other locations of a structure (e.g., bed room interface 760) to lower portions (or less accessible locations) of the user interface. In an embodiment, an alert notification may be superimposed over other interfaces of the user interface. In an embodiment, an alert notification may be presented as a dialog window over a user interface, which prevents the user from accessing interfaces within the user interface until the alert notification is addressed.

Figure 8:
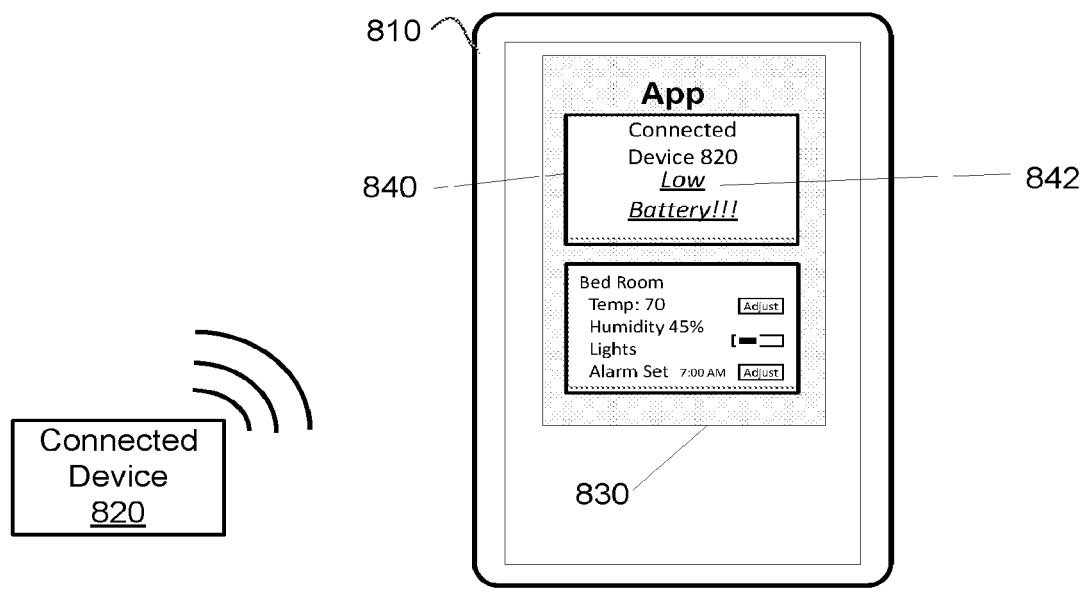
FIG. 8 illustrates another example of providing event-based contextual interactions with connected devices.

FIG. 8 illustrates another example of providing event-based contextual interactions with connected devices. In the example of FIG. 8, a client application (e.g., client application 220 of FIG. 2) running on computing device 810 may receive an event notification corresponding to a connected device transitioning from a first state to a second state. As used herein, "transitioning" from one state to another refers to the process of going from one state to another. For example, in FIG. 8, connected device 820 has transitioned from an adequate battery state to a low battery state. Other examples of connected device states include: on or off, open or closed, active or inactive, and the like. In an embodiment, the event notification is received directly from a connected device. For example, a connected device may directly transmit an event notification to a computing device in accordance with a wireless protocol (e.g., a BLE protocol).

In an embodiment, connected devices may have states corresponding to a defined set point. For example, a thermostat of a climate control system monitoring an ambient environment may have states corresponding to a temperature set point. In this example, a first state may indicate that the ambient environment of the thermostat is below a particular thermal set point (e.g., 72 degrees Fahrenheit). If the ambient environment rises above the particular thermal set point, the thermostat may transition to a second state indicating as much.

In response to receiving the event notification, the client may update a user interface to include an alert notification (e.g., user interface 830 and alert notification 840, respectively). As shown in FIG. 8, alert notification 840 includes information 842 indicative of the status transition obtained from the event notification. In an embodiment, the client application may identify a functionality provided by a connected device that relates to the status transition. In an embodiment, the client application may present an interface element on an alert notification that is selectable for implementing the identified functionality. For example, a client application receives an event notification indicating that a connected device providing a door lock function has transitioned from a locked state to an unlocked state. In this example, the client application may present a user interface element on an alert notification that is selectable to return the connected device to the locked state by actuating its door locking function.

Figure 9:
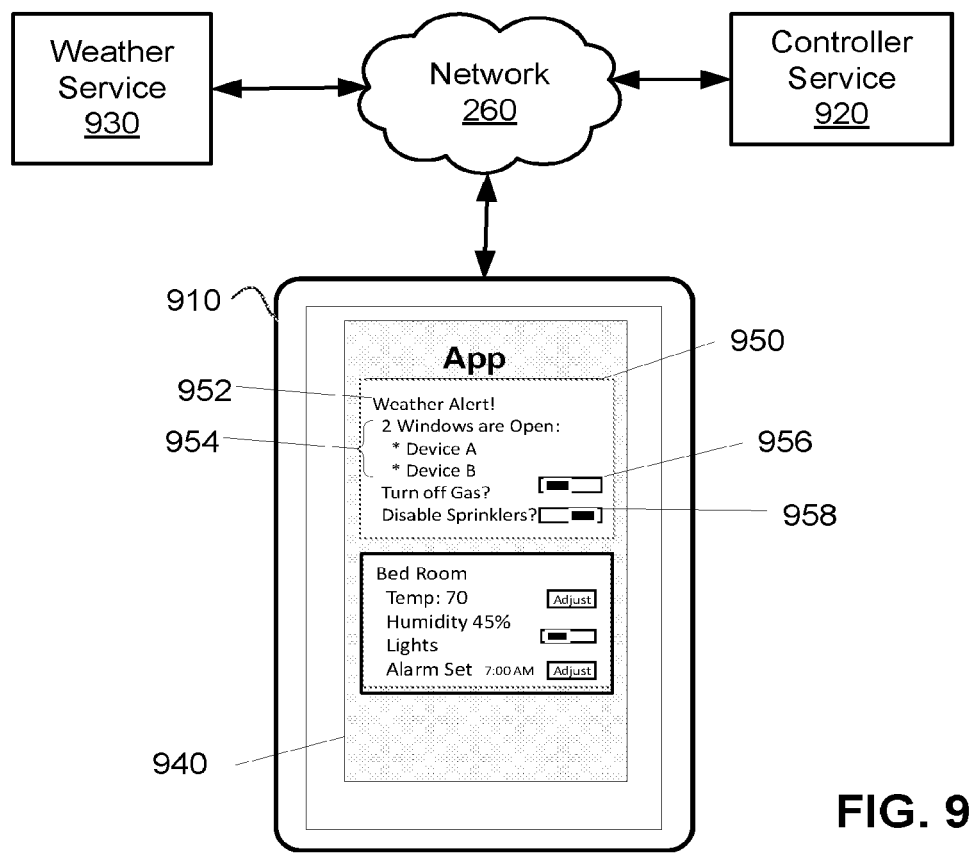
FIG. 9 illustrates another example of providing event-based contextual interactions with connected devices.

FIG. 9 illustrates another example of providing event-based contextual interactions with connected devices. In the example of FIG. 9, a client application (e.g., client application 220 of FIG. 2) running on computing device 910 may receive an event notification corresponding to an extrinsic condition that is detected using extrinsic information provided by a remote server. As used here, "extrinsic condition" refers to conditions occurring external to a structure associated with connected devices that nevertheless impact conditions within the structure. In this example, the extrinsic condition may be a meteorological event (e.g., rain) that is detected using weather data provided by weather service 930 via network 250. In an embodiment, the client application may subscribe to the extrinsic information provided by the remote server. In an embodiment, a cloud-based service (e.g., controller service 920) providing computing resources to the client application may subscribe to the extrinsic information provided by the remote server.

In response to receiving the event notification, the client may update a user interface to include an alert notification (e.g., user interface 940 and alert notification 950, respectively). As shown in FIG. 9, alert notification 950 includes information 952 describing an event obtained from the event notification (i.e., the weather alert). FIG. 9 further illustrates that the client application may also identify status information associated with connected devices that relate to the extrinsic condition. The information corresponding to that identified status information (e.g., status information 954) may be presented on the alert notification.

In an embodiment, the client application may also identify functionalities provided by connected devices that relate to the extrinsic condition and present interface elements corresponding to those identified functionalities. In the example of FIG. 9, the client application has identified a sprinkler control function and an actuator function for closing a gas valve as being related to the weather alert. In this example, the client application presented user interface elements corresponding to those identified functionalities (i.e., interface elements 956 and 958) on alert notification 950.

Figure 10:
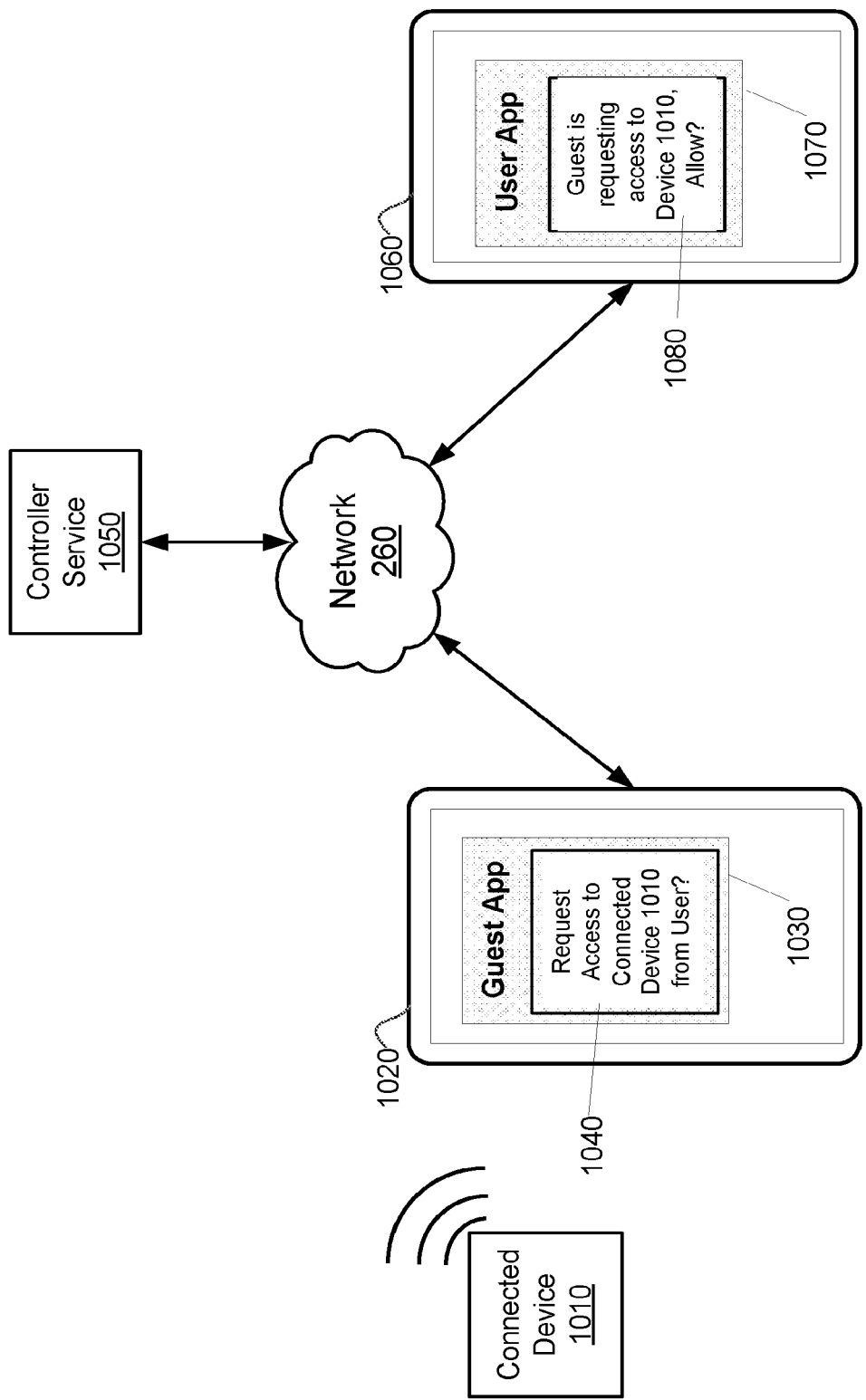
FIG. 10 illustrates an example of providing guest access for contextual interactions with connected devices.

FIG. 10 illustrates an example of providing guest access for contextual interactions with connected devices. In the example of FIG. 10, a guest application running on a guest computing device 1020 may detect data indicative of a connected device 1010 proximate to guest computing device 1020. In an embodiment, the data indicative of connected device 1010 is a wireless signal received from connected device 1010. In an embodiment, the wireless signal is received from connected device 1010 in response to a polling signal transmitted by guest computing device 1020. In an embodiment, the data indicative of connected device 1010 is obtained using GPS signals, WiFi signals, or a combination thereof.

In response to detecting the data indicative of connected device 1010, the guest application may update guest interface 1030 to present a request interface 1040 associated with connected device 1010. An access request may be received via request interface 1040 indicating that a guest user associated with guest computing device 1020 seeks access to functionalities provided by connected device 1010. The guest application may forward the access request via network 250 to a cloud-based service hosted by a remote server (e.g., controller service 1050) that is associated with connected device 1010.

Controller service 1050 may forward the access request received from guest computing device 1020 via network 250 to user computing device 1060. In an embodiment, user computing device 1060 is a computing device that is registered with controller service 1050 as having administrative privileges with respect to connected device 1010. In an embodiment, user computing device 1060 is associated with a user account that is registered with controller service 1050 as having administrative privileges with respect to connected device 1010.

In response to receiving the access request from controller service 1050, a user application running on user computing device 1060 may update user interface 1070 to present a permission interface 1080. In an embodiment, a permission interface may be superimposed over other interfaces on user interface 1070. In an embodiment, a permission interface may be presented as a dialog window over user interface 1070, which prevents a user from accessing interfaces within user interface 1070 until the permission interface is addressed. A permission setting granting access to connected device 1010 may be received via permission interface 1080 that grants one or more access rights to connected device 1010. In response to receiving the permission setting, the guest application may update guest interface 1030 to present an access interface that enables access to the functionalities of connected device 1010 as specified in the one or more access rights.

In an embodiment, the one or more access rights may limit the guest user to a particular type of access with respect to connected device 1010. For example, the one or more access rights may provide the guest user with data access to connected device 1010. In this example, the guest application may update guest interface 1030 to present an access interface that enables access to information regarding connected device 1010, such as status information. As another example, the one or more access rights may provide the guest user with control access to connected device 1010. In this example, the guest application may update guest interface 1030 to present an access interface that enables access to modify one or more control parameters of connected device 1010.

In an embodiment, the one or more access rights may be further subject to one or more contextual rules included in the permission setting. Examples of contextual rules include rules relating to temporal conditions, a proximity of a registered device to a connected device, a user account associated with a guest computing device, a location conditions, and the like. For example, a contextual rule may limit the one or more access rights to a particular time period, day, date range, etc. As another example, a contextual rule may limit the one or more access rights to instances where user computing device 1060 (or another registered device) is within a specified proximity to connected device 1010. In another example, a contextual rule may limit the one or more access rights according to an account of the guest user associated with guest computing device 1020. As another example, a contextual rule may limit the one or more access rights to instances where guest computing device 1020 is proximate to a particular location.

Figure 11:
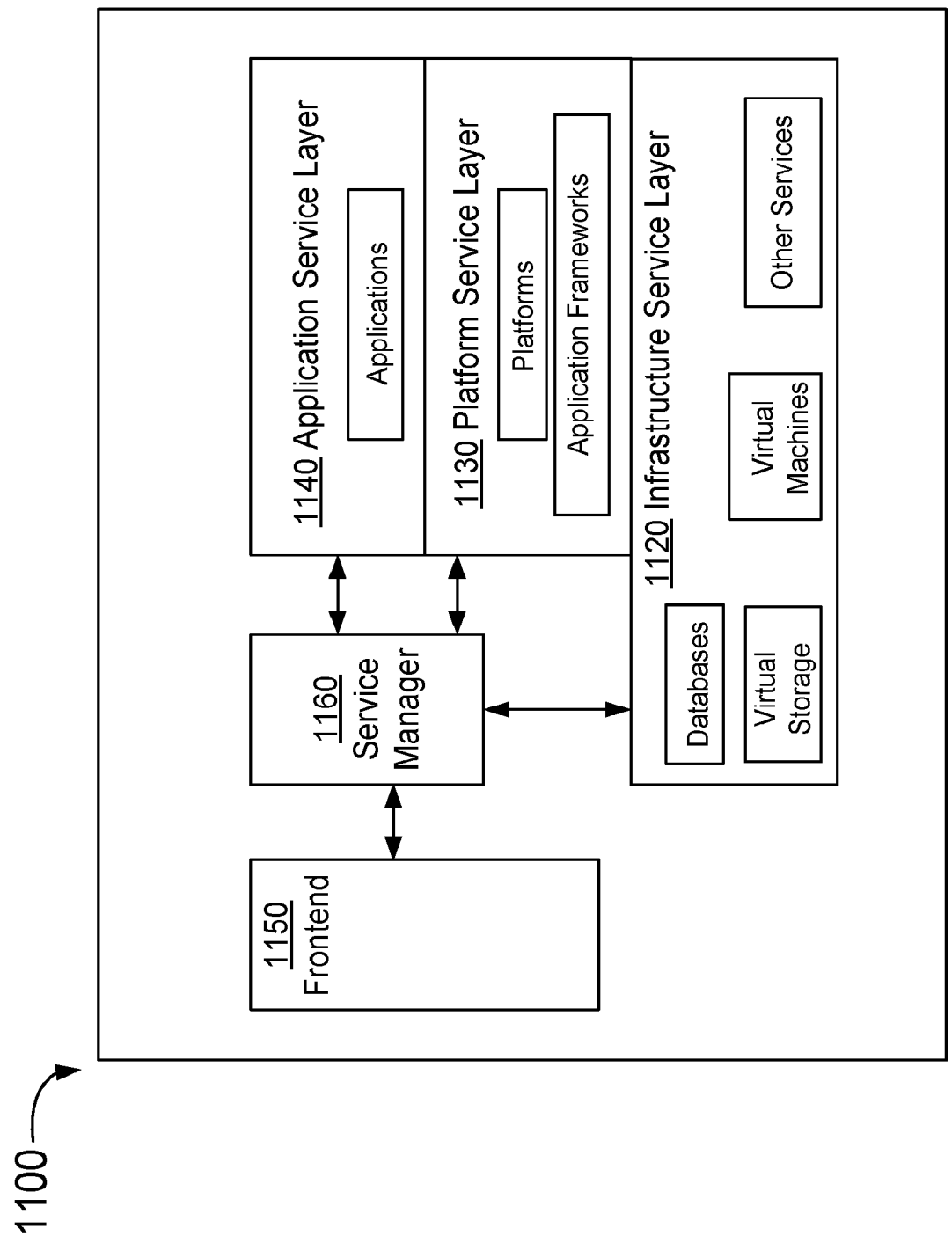
FIG. 11 is a schematic diagram illustrating an example cloud-based server that may be used in accordance with aspects of the present invention.

FIG. 11 is a schematic diagram illustrating an example cloud-based server 1100 that may be used in accordance with the present disclosure. As discussed above with respect to FIG. 2, cloud-based server 1100 may provide infrastructure services, platform services, and software application services. In an embodiment, cloud-based server 1100 is used to implement at least a portion of server 140 in FIG. 2. The infrastructure services may include virtualized resources, such as virtual machines, virtual storage, and so on. The infrastructure services may also include virtualized services, such as database services and others. Each of these infrastructure services may be deployed in an infrastructure service layer 1120.

The scale and various aspects, such as data, connectivity, and dependency relationships within and between service components, of an infrastructure service deployment are configurable by an administrator user. For instance, the administrator user may submit a configuration specification to cloud-based server 1100 via a frontend interface 1150 and service manager 1160. The configuration specification can be translated into infrastructure and kernel level APIs calls that create, re-create, move, or delete components such as virtual machines and services, and assign or change attributes of the components.

In addition to the infrastructure services, cloud-based server 1100 may also provide platform services, such as an environment for running virtual machines or a framework for developing and launching a particular type of software applications. The platform services may be implemented in a platform service layer 1130 over the infrastructure service layer 1120, and may employ one or more infrastructure services configured in a particular manner. Configuration of platform services can be accomplished by program code written according to the APIs of the platform services and, optionally, the APIs of the infrastructure services that are employed in enabling the platform services.

In some examples, cloud-based server 1100 may also provide software application services in an application service layer 1140. A software application can be installed on one or more virtual machines or deployed in an application framework in the platform service layer 1130. The software application can also communicate with one or more infrastructure service components, such as databases, in the infrastructure layer 1120. The installation and configuration of the software application in the application service layer 1140 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive. It is to be understood that the subject matter defined in the appended claims is not necessarily limited to the specific features or acts described above. Rather, the illustrations of the aspects described herein are intended as examples of implementing the claims and other equivalent features and acts are intended to be within the scope of the claims.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

What is claimed is:

1. A system for providing an application, the system comprising:
   a processor;
   a virtual machine monitor configured to share physical hardware with a plurality of computing devices, thereby allowing one or more processors to perform various functionalities on behalf of the plurality of computing devices, wherein at least one of the plurality of computing devices is a mobile device, and
   a virtualized application executing in a virtualized environment communicatively coupled to the mobile device via a network, wherein:
      the mobile device comprises a display to present a user interface, the user interface to access functionalities provided by a plurality of Internet of Things (IoT) devices, wherein a first set of one or more of the plurality of IoT devices is in a first location and a second set of one or more of the plurality of IoT devices is in a second location,
      the virtualized application is deployed within a session-based desktop environment,
      the mobile device is operable to receive an alert notification from any of the plurality of IoT devices, and
      the alert notification prevents access to the user interface; and
      the system is configured to:
         monitor for a wireless signal, at the mobile device, wherein a current position of the mobile device is determined according to data on the wireless signal,
         determine, at a first time, that the current position is within a threshold proximity of the first location, and
         in response to determining that the current position is within the threshold proximity of the first location, update the user interface to emphasize a first location interface corresponding to the first location over a second location interface corresponding to the second location.

2. The system of claim 1, wherein the system is configured to:
  determine, at a second time subsequent to the first time, that the current position is in closer proximity to the second location than the first location; and in response to determining that the current position is in closer proximity to the second location, update the user interface to emphasize the second location interface corresponding to the second location over the first location interface.

3. The system of claim 1, wherein the wireless signal is received from a first IoT device at the first location.

4. The system of claim 3, wherein the wireless signal received from the first IoT device is responsive to a polling signal transmitted by the mobile device.

5. The system of claim 3, wherein the wireless signal is a Bluetooth low energy (BLE) beacon signal.

6. The system of claim 1, wherein the system is configured to:
  designate the first location as a target location thereby causing the system to route control commands received via the user interface to the first location.

7. The system of claim 6, wherein designating the first location as the target location causes the system to route control commands received via any input of the mobile device to the first location.

8. The system of claim 1, wherein at least one of the plurality of IoT devices is connected to control a light.

9. The system of claim 1, wherein at least one of the plurality of IoT devices is connected to control a source of water.

10. A method for an application, the method comprising:
  share physical hardware, via a virtual machine monitor, with a plurality of computing devices, thereby allowing one or more processors to perform various functionalities on behalf of the plurality of computing devices, wherein at least one of the plurality of computing devices is a mobile device, and
  in a virtualized application executing in a virtualized environment communicatively controlled with the mobile device:
    presenting a user interface on a display of the mobile device;
    accessing, via the user interface, functionalities provided by a plurality of Internet of Things (IOT) devices, wherein a first set of one or more of the plurality of IoT devices is in a first location and a second set of one or more of the plurality of IoT devices is in a second location;
    deploying the virtualized application within a session-based desktop environment;
    receiving an alert notification, via the mobile device, from any of the plurality of IoT devices;
    preventing access to the user interface according to the alert notification;
    monitoring for a wireless signal, at the mobile device, wherein a current position of the mobile device is determined according to data on the wireless signal;
    determining, at a first time, that the current position is within a threshold proximity of the first location; and
    in response to determining that the current position is within the threshold proximity of the first location, updating the user interface to emphasize a first location interface corresponding to the first location over a second location interface corresponding to the second location.

11. The method of claim 10, wherein the method comprises:
  determining, at a second time subsequent to the first time, that the current position is in closer proximity to the second location than the first location; and in response to determining that the current position is in closer proximity to the second location, updating the user interface to emphasize the second location interface corresponding to the second location over the first location interface.

12. The method of claim 10, wherein the wireless signal is received from a first IoT device at the first location.

13. The method of claim 12, wherein the wireless signal received from the first IoT device is responsive to a polling signal transmitted by the mobile device.

14. The method of claim 12, wherein the wireless signal is a Bluetooth low energy (BLE) beacon signal.

15. The method of claim 10, wherein the method comprises:
  designating the first location as a target location thereby causing the method to route control commands received via the user interface to the first location.

16. The method of claim 15, wherein designating the first location as the target location causes the method to route control commands received via any input of the mobile device to the first location.

17. The method of claim 10, wherein at least one of the plurality of IoT devices is connected to control a light.

18. The method of claim 10, wherein at least one of the plurality of IoT devices is connected to control a source of water.

* * * * *